United States Patent
Iwata

(10) Patent No.: US 10,652,411 B2
(45) Date of Patent: May 12, 2020

(54) REMOTE OPERATION APPARATUS, REMOTE OPERATION SYSTEM, AND NON-TRANSITORY COMPUTER READABLE MEDIUM STORING PROGRAM WITH TEXT INPUT ASSISTANCE

(71) Applicant: FUJI XEROX CO., LTD., Tokyo (JP)

(72) Inventor: Nobuo Iwata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 14 days.

(21) Appl. No.: 15/782,841

(22) Filed: Oct. 12, 2017

(65) Prior Publication Data

US 2018/0152571 A1 May 31, 2018

(30) Foreign Application Priority Data

Nov. 25, 2016 (JP) ................. 2016-229266

(51) Int. Cl.
*H04N 1/00* (2006.01)
*G06F 9/451* (2018.01)
*H04L 29/08* (2006.01)

(52) U.S. Cl.
CPC ......... *H04N 1/00408* (2013.01); *G06F 9/452* (2018.02); *H04L 67/2823* (2013.01); *H04N 1/00129* (2013.01); *H04N 1/00204* (2013.01); *H04L 67/125* (2013.01); *H04N 2201/0075* (2013.01)

(58) Field of Classification Search
CPC .......... H04N 1/00408; H04N 1/00129; H04N 1/00204; H04N 2201/0075; H04L 67/2823; H04L 67/125; G06F 9/452
See application file for complete search history.

(56) References Cited

U.S. PATENT DOCUMENTS

| 9,432,526 | B2 | 8/2016 | Kawabata et al. |
| 2010/0115454 | A1* | 5/2010 | Tuli ................... H04L 67/2861 715/780 |
| 2014/0376042 | A1 | 12/2014 | Kawabata et al. |
| 2018/0004546 | A1* | 1/2018 | Ferras Pereira .... G06F 3/04886 |

FOREIGN PATENT DOCUMENTS

| JP | 2015005911 | 1/2015 |
| JP | 2015-158719 | 9/2015 |
| JP | 2016-099912 | 5/2016 |

\* cited by examiner

*Primary Examiner* — John T Repsher, III
(74) *Attorney, Agent, or Firm* — JCIPRNET

(57) ABSTRACT

A remote operation apparatus includes a display that displays a desktop screen of an apparatus to be remotely operated; and a controller that displays an input field on a desktop screen of the remote operation apparatus and activates a text input assistance module of the remote operation apparatus in a case in which an activation instruction to activate the text input assistance module of the remote operation apparatus is input, and enables the text input assistance module of the remote operation apparatus to input text to the input field.

12 Claims, 10 Drawing Sheets

REMOTE OPERATION APPARATUS, REMOTE OPERATION SYSTEM, AND NON-TRANSITORY COMPUTER READABLE MEDIUM STORING PROGRAM WITH TEXT INPUT ASSISTANCE

CROSS-REFERENCE TO RELATED APPLICATIONS

This application is based on and claims priority under 35 USC 119 from Japanese Patent Application No. 2016-229266 filed Nov. 25, 2016.

BACKGROUND

Technical Field

The present invention relates to a remote operation apparatus, a remote operation system, and a non-transitory computer readable medium storing a program.

SUMMARY

According to an aspect of the invention, there is provided a remote operation apparatus including: a display that displays a desktop screen of an apparatus to be remotely operated; and a controller that displays an input field on a desktop screen of the remote operation apparatus and activates a text input assistance module of the remote operation apparatus in a case in which an activation instruction to activate the text input assistance module of the remote operation apparatus is input, and enables the text input assistance module of the remote operation apparatus to input text to the input field.

BRIEF DESCRIPTION OF THE DRAWINGS

Exemplary embodiment(s) of the present invention will be described in detail based on the following figures, wherein.

DETAILED DESCRIPTION

In the related art, there are known technologies for remotely operating computers using other computers.

Figure 12:
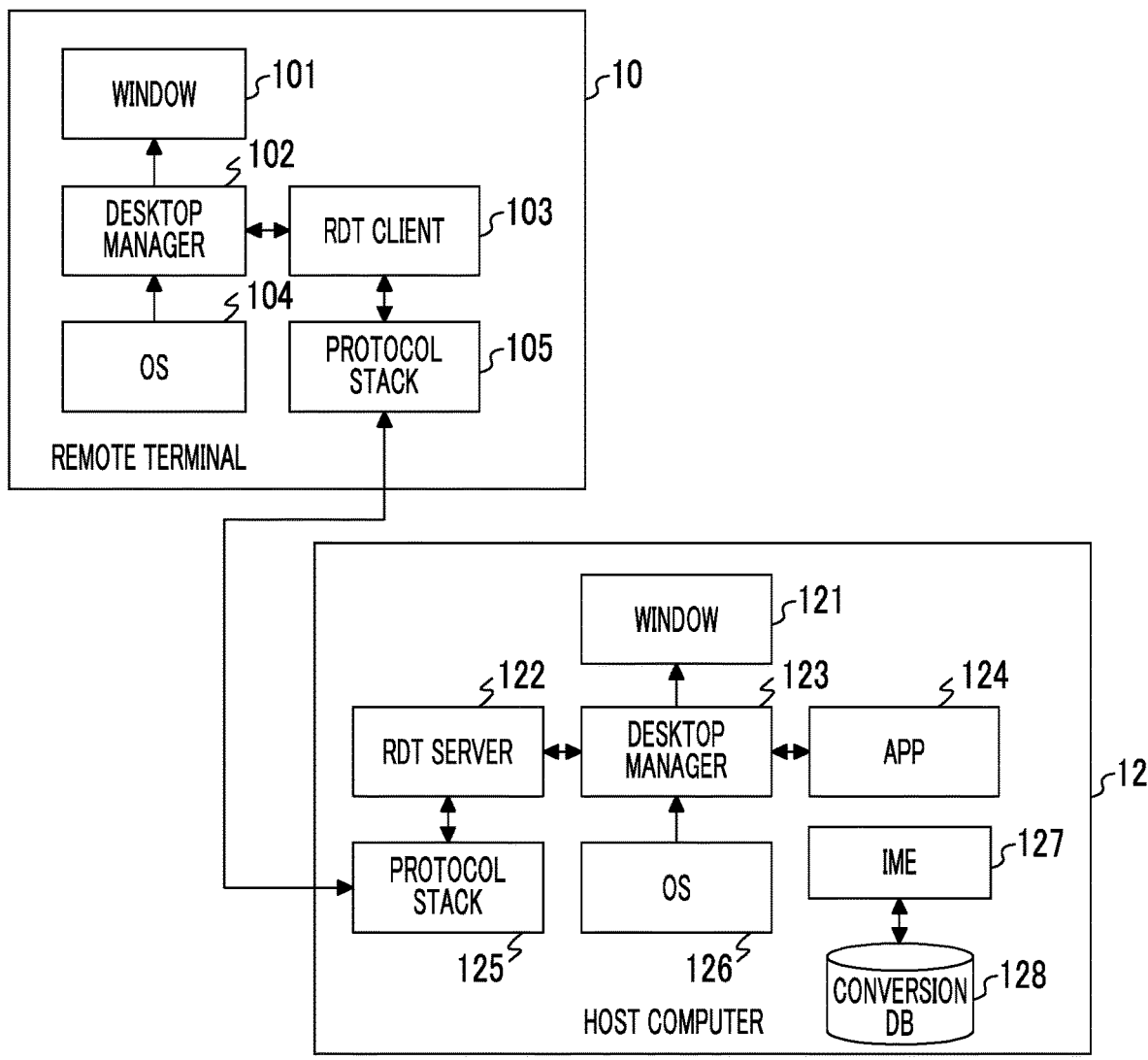
FIG. 12 is a diagram showing basic configurations of a remote terminal and a host computer.

FIG. 12 is a diagram showing a basic configuration of a remote desktop (RDT) of the related art. In this case, a remote terminal 10 and a host computer 12 are connected to each other by a network. Thus, the remote terminal 10 remotely operates the host computer 12.

In a case in which an operating system (OS) 126 of the host computer 12 is activated, a desktop manager 123 is activated. The desktop manager 123 generates a master window 121 and draws a desktop on a display. Various applications (apps) 124 generate slave windows in the master window and transmit drawing commands to the desktop manager 123. The desktop managers 123 draw the slave windows in the window 121.

On the other hand, a remote desktop (RDT) client 103 of the remote terminal 10 is connected to a RDT server 122 of the host computer 12 via protocol stacks 105 and 125 such as TCP/IP. Ina case in which the connection is established, the RDT client 103 generates a window 101. The RDT server 122 acquires drawing information in the window 121 via the desktop manager 123 and transmits the drawing information to the RDT client 103 via the protocol stacks 125 and 105.

The RDT client 103 draws a drawing command on the window 101 by transmitting the drawing command to the desktop manager 102 based on the received drawing information. The RDT server 122 monitors a change in the drawing and transmits drawing information regarding a changed portion as a response to an updating request from the RDT client 103 to the RDT client 103. At this time, coordinate information of a cursor is also transmitted to the RDT client 103 as in the drawing information.

An event of a keyboard or a mouse of the remote terminal 10 is transmitted from the OS 104 to the RDT server 122 via the desktop manager 102 and the RDT client 103. A key code of the keyboard is converted into a key symbol independent of a difference in the keyboard to be transmitted.

The RDT server 122 transmits such an event to the desktop manager 123 and the desktop manager 123 notifies the app 124 of the event. The app 124 displays text on the window 121 based on the notified event or changes a cursor position of the window 121.

A display region of the RDT is one object in which a rectangular bitmap image is displayed on the side of the remote terminal 10. An input region of the desktop viewed in the display region on the side of the host computer 12 is a part of the rectangular bitmap image. Accordingly, on the side of the remote terminal 10, the part is not recognized as an input region.

A key event is transmitted from the side of the remote terminal 10 to the side of the host computer 12 and is processed as an event from the keyboard or the mouse connected to the host computer 12 on the side of the host computer 12. The key event is operated on the desktop on the side of the host computer 12 or the window in the desktop and is operated on the desktop or the window in the desktop to be changed. A changed result is transmitted as a bitmap to the side of the remote terminal 10 and is reflected in a desktop region on the side of the remote terminal 10. An application protocol between the RDT client 103 of the remote terminal 10 and the RDT server 122 of the host computer 12 is regulated to a remote frame buffer (RFB) protocol, a remote desktop protocol (RDP), or the like.

A key code of the keyboard of the remote terminal 10 is converted into a key symbol to be transmitted to the host computer 12. The key symbol is supplied to a text input auxiliary module of the host computer 12, for example, an input method editor (IME) 127. The IME 127 determines a conversion result with reference to a conversion database (DB) 128. The conversion database (DB) 128 stores a dictionary or conversion learning data. In a case in which the conversion result is determined by the IME 127, the text code is supplied to the app 124.

In this way, even in the case in which the keyboard of the remote terminal 10 is operated, conversion is performed using the IME 127 on the side of the host computer 12. Therefore, in a case in which the host computer 12 to be remotely operated is different, a dictionary or conversion learning differs for each host computer. Thus, there is a problem that the dictionary may not be efficiently used or the conversion learning may not be performed. In a case in which the IME differs for each host computer, input operability differs. Therefore, the conversion operation is necessarily cautious and erroneous conversion or the like may occur. Further, in a case in which the remote terminal 10 is used except for remote operation, the dictionary or a result of the conversion learning is not locally available. Therefore, there is also a problem that an efficient input operation may not be performed.

Hereinafter, exemplary embodiments of the invention will be described exemplifying an input method editor (IME) as a text input assistance module with reference to the drawings. However, the invention is not limited to a specific input method editor. In addition, a "text input assistance module" is a software program executing assistance in a case in which text is input and means, for example, a Japanese IME that performs kana-kanji conversion.

First Exemplary Embodiment

Figure 1:
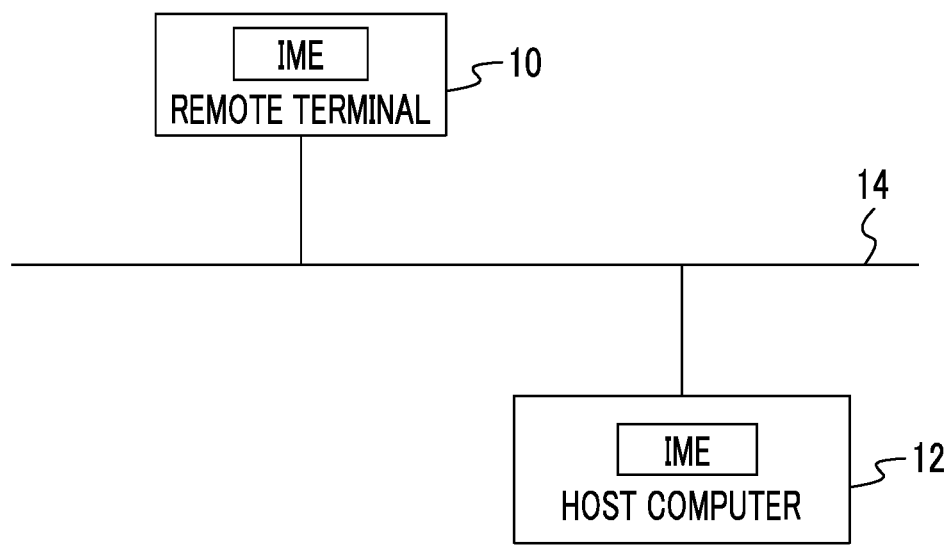
FIG. 1 is a diagram showing a configuration of a system according to an exemplary embodiment.

FIG. 1 is a diagram showing a configuration of a system according to an exemplary embodiment. A remote terminal 10 and a host computer 12 are connected to each other via a network 14. The remote terminal 10 functions as a remote operation apparatus and remotely operates the host computer 12. The remote terminal 10 includes an IME and the host computer 12 also includes an IME.

In the related art, as described above, in a case in which the remote terminal 10 and the host computer 12 are connected to be able to transmit and receive data via the network 14 and the remote terminal 10 remotely operates the host computer 12, the IME of the host computer 12 is used. In the exemplary embodiment, however, the IME of the remote terminal 10 is used instead of the IME of the host computer 12.

Figure 2:
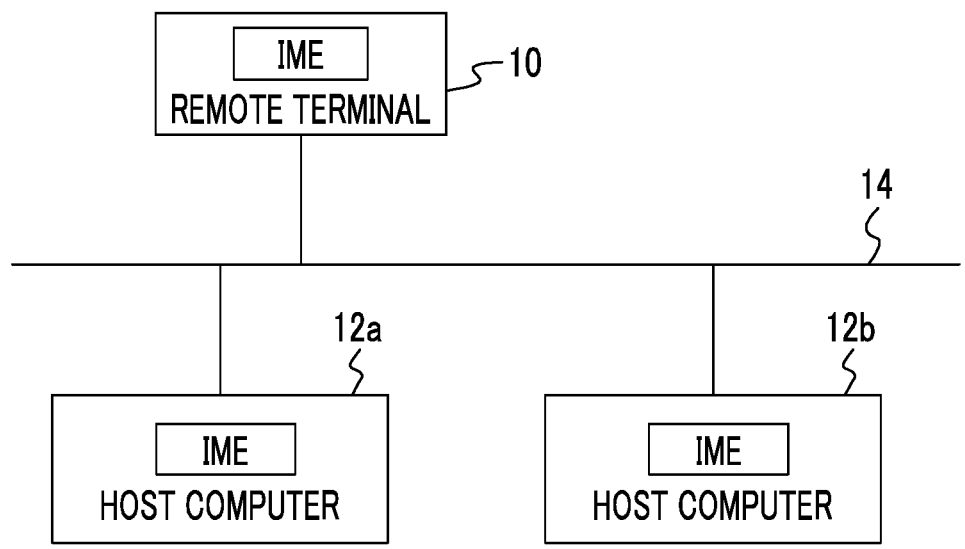
FIG. 2 is a diagram showing another configuration of the system according to the exemplary embodiment.

FIG. 2 is a diagram showing another configuration of the system according to the exemplary embodiment. The remote terminal 10 is connected to plural host computers 12a and 12b via the network 14 and remotely operates the plural host computers 12a and 12b. Even in this case, the IME of the remote terminal 10 is used rather than the IMEs of the host computers 12a and 12b. Since a key symbol input from a keyboard of the remote terminal 10 is processed and converted by the IME of the remote terminal 10, and then is transmitted to the host computers 12a and 12b, a conversion result or a learning result is accumulated in the remote terminal 10.

Figure 3:
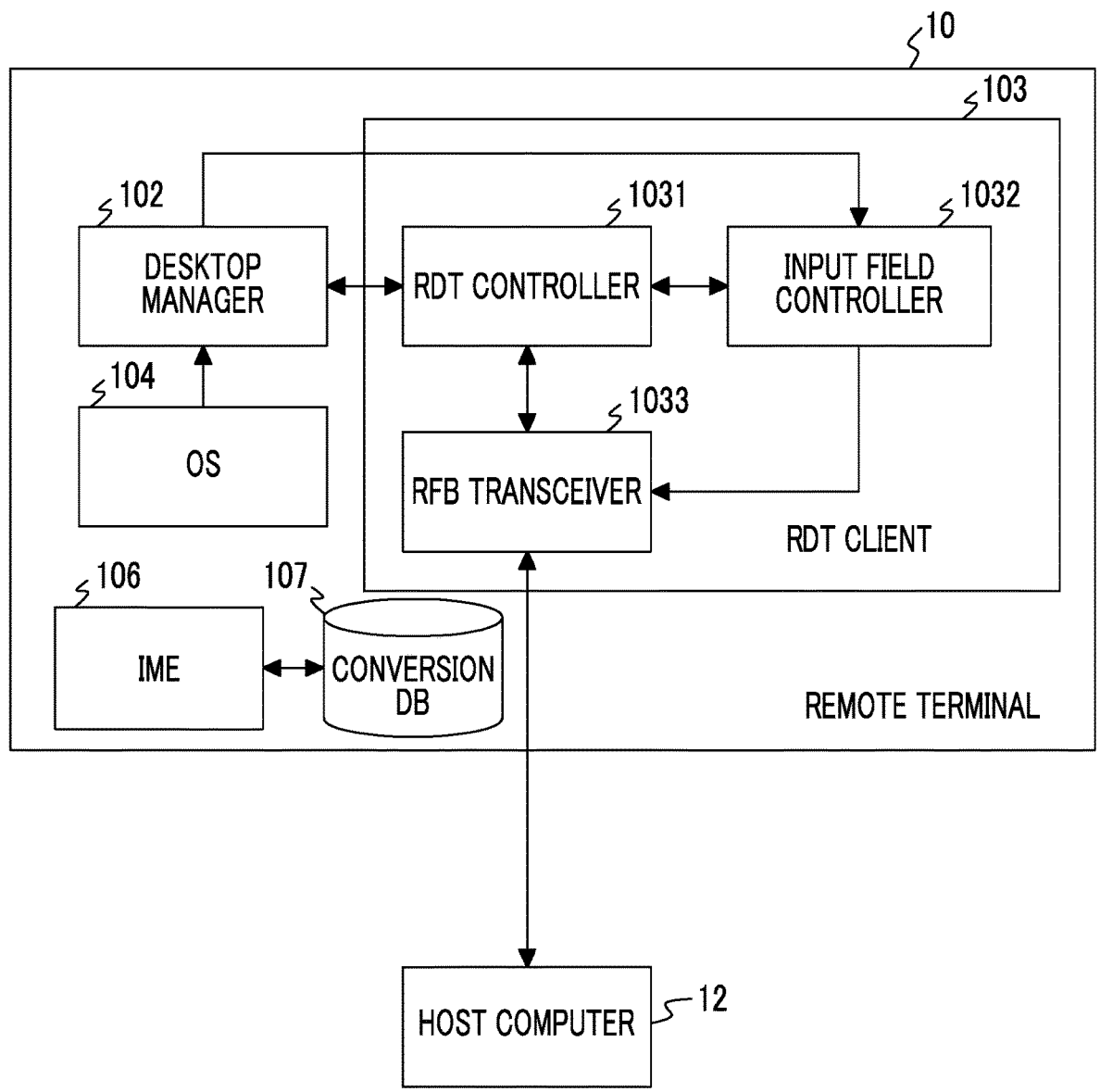
FIG. 3 is a block diagram showing a configuration of a remote terminal.

FIG. 3 is a block diagram showing a configuration of the remote terminal 10 according to the exemplary embodiment. A basic configuration is the same as the configuration of the block diagram shown in FIG. 12. The remote terminal 10 includes a window 101, a desktop manager 102, an RDT client 103, an OS 104, an IME 106, and a conversion database (DB) 107. A hardware configuration of the remote terminal 10 includes a CPU, a ROM, a program memory such as an HDD or an SSD, a working memory such as a RAM, a communication interface, and an input and output interface such as a keyboard, a mouse, or a display as in a general personal computer. The CPU performs various processes by executing processing programs stored in the program memory. The window 101 is display on the display by causing the CPU to execute a processing program. The desktop manager 102, the RDT client 103, and the IME 106 are logic modules realized by causing the CPU to perform processing programs.

The RDT client 103 is connected to an RDT server 122 of the host computer 12 via protocol stack 105 and 125 (see FIG. 12) such as TCP/IP. In a case in which the connection is established, the RDT client 103 generates the window 101 on the display via the desktop manager 102. On the other hand, the RDT server 122 of the host computer 12 acquires drawing information in the window 121 via the desktop manager 123 and transmits the drawing information to the RDT client 103 via the protocol stacks 125 and 105.

The desktop manager 102 functions as a display and draws a desktop screen of the host computer 12 on the window 101 based on the drawing information received from the RDT server 122 of the host computer 12. The desktop manager 102 may display the desktop screen of the host computer 12 on the window 101 in a state in which the IME 127 of the host computer 12 is activated. The desktop screen of the host computer displayed on the display of the remote terminal 10, that is, a display region of a remote desktop, is one object for displaying a rectangular bitmap image on the side of the remote terminal 10 and input region of the desktop on the host computer 12 is a part of the rectangular bitmap image.

The RDT client 103 functions as a controller or a first controller and includes an RDT controller 1031, an input field controller 1032, and an RFB transceiver 1033. The RDT controller 1031, the input field controller 1032, and the RFB transceiver 1033 are also logic modules realized by causing the CPU to perform processing programs. Of course, at least some of these units may be configured as hardware circuits.

The RDT controller 1031 controls an entire operation of the RDT client 103. The input field controller 1032 controls display and non-display of an input field based on an instruction from the RDT controller 1031 and performs acquiring or clearing a text string input to the input field. The RFB transceiver 1033 controls transmission and reception of data to and from the RDT server 122 of the host computer 12 based on an RFB protocol. As described above, the RFB protocol is an application protocol between the RDT client 103 and the RDT server 122. Drawing information or event information is converted in conformity to the RFB protocol to be transmitted and received. An overview of the RFB protocol is as follows.

<Remote Terminal 10→Host Computer 12>

FrameBufferEvent: to request transmission of a rectangular bitmap

Coordinates/width and height sizes

KeyEvent: key symbol

Up/down discrimination

PointerEvent: coordinates of mouse

Up/down discrimination types of buttons (left/middle/right)

ClientCutText: to send a text string to a cut buffer of a host.

<Host Computer 12∝Remote Terminal 10>

FrameBufferUpdate: to request transmission of a rectangular bitmap

Coordinates/height and width sizes+bitmap data.

The RDT client 103 receives the rectangular bitmap image of the desktop screen of the host computer 12 from the RDT server 122 of the host computer 12 and supplies the rectangular bitmap image to the desktop manager 102. The RDT client 103 receives a key event (a keyboard) or a pointer event (a mouse, a touch, or the like) and transmits the key event or the pointer event to the RDT server 122 of the host computer 12.

Here, in the case of a specific key event among key events, specifically, a key event meaning IME activation, the RDT client 103 does not transmit this key event to the RDT server 122 of the host computer 12. Specifically, the RDT controller 1031 determines whether the key event is a key event indicating IME activation. In a case in which the key event is the key event meaning the IME activation, the IME 106 of the remote terminal 10 is activated without transmitting the key event to the RDT server 122 and the input field controller 1032 is instructed to display an input field.

Figure 4:
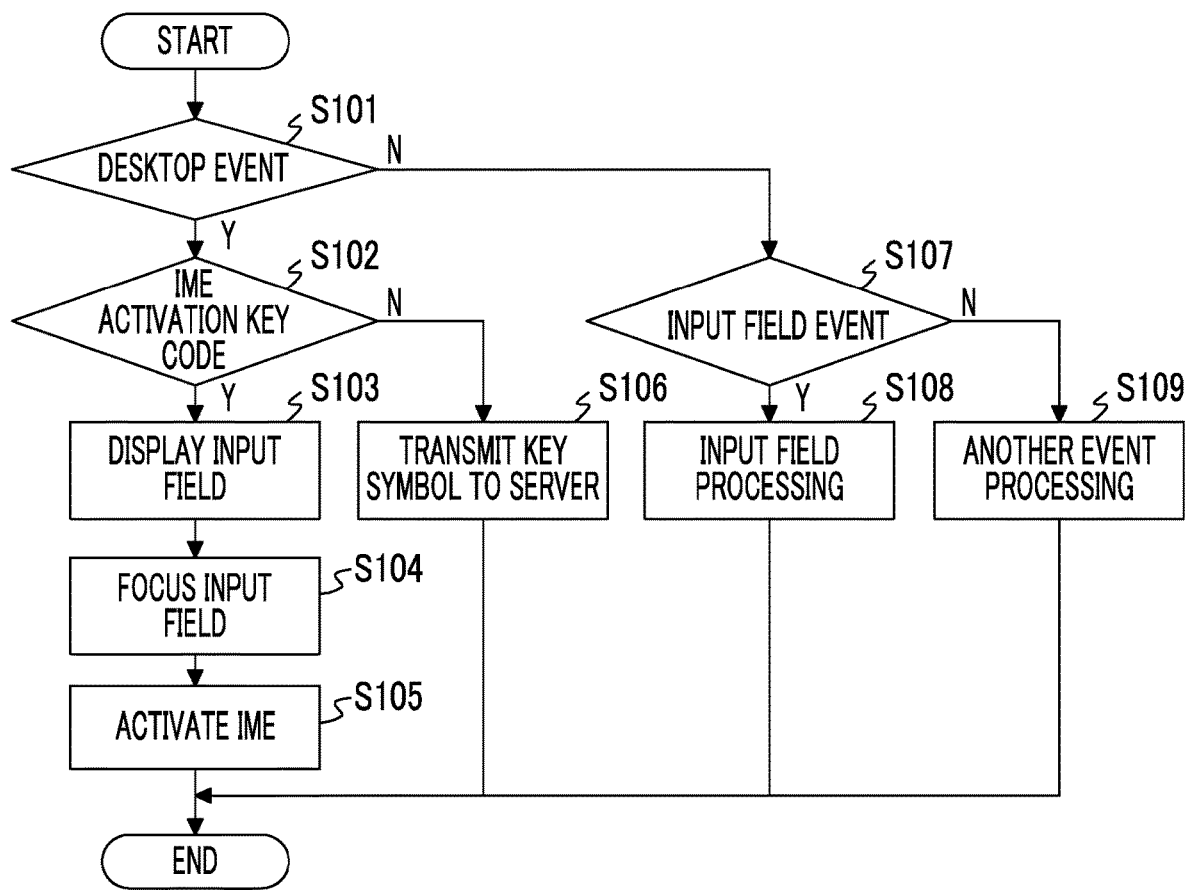
FIG. 4 is a flowchart (part 1) showing a process of the remote terminal according to a first exemplary embodiment.

FIG. 4 is a flowchart showing key event processing of the RDT controller 1031 according to the exemplary embodiment.

First, the RDT controller 1031 determines whether an event is a desktop event, that is, whether the event is an event regarding an object of a display region of a desktop screen of the host computer 12 displayed in the window 101 of the remote terminal 10 (S101). An input region of the desktop screen of the host computer 12 is a part of the rectangular bitmap image, as described above. For example, an operation on the mouse in the input region is determined to be the desktop event.

In a case in which the event is the desktop event (YES in S101), the RDT controller 1031 determines whether a subsequently input event is an IME activation key code (S102). The IME activation key code can differ depending on an operating system (OS) or a keyboard to be used. For example, a key code generated by pressing an IME activation key which is a half-size/full-size key in Window (registered trademark) or Linux (registered trademark) or a command key in Mac OS can be treated as the IME activation key code. The key in this example is also a key which is used for IME stop. In a case in which a key code generated in a stop state which is an IME state at the time of pressing a key is different from a key code generated in a state which is the IME state, the former can be treated as an IME activation code and the latter can be treated as an IME activation stop code. Alternatively, a key code of one of the IME activation and the IME stop is generated in some cases in accordance with a menu displayed by the key. Only the same key code is generated in some cases. In this case, the IME activation state is acquired. Then, the state is treated as the IME activation code in a case in which the state is a stop state, and the state is treated as the IME stop code in a case in which the state is an activation state. Alternatively, an internal state may be uniquely managed. Whether the key code is treated as the IME activation code or the IME stop code may be determined depending on the internal state.

In a case in which the event is the IME activation key code (YES in S102), the RDT controller 1031 gives an instruction to the input field controller 1032 and the input field controller 1032 displays an input field on the window 101 (S103). The input field is focused (S104). Here, the "focus" refers to a state in which a specific input element is selected and an input can be input. Further, the input field controller 1032 activates the IME 106 of the remote terminal 10 (S105). Thus, a user of the remote terminal 10 can perform an input to the input field displayed in S104 with the IME 106 of the remote terminal 10. Note that the IME 106 of the remote terminal 10 is activated an input to the input field is performed despite of activation of the IME 127 of the host computer 12 even in a case in which the remote terminal 10 is connected to the host computer 12. For example, by displaying the activation of the IME 106 on the window 101, the user of the remote terminal 10 may be informed that the IME 106 of the remote terminal 10 is activated.

In a case in which the IME 106 is stationed in the system in the process of S105, connection to the stationed IME 106 may be made rather than the activation of the IME 106. The activation of the IME is meant to include connection of the IME. The input field controller 1032 may not activate the IME 106, but the OS 104 or the like may be entrusted to the activation. Further, in a case in which the input field is focused, the OS 104 or the like may be configured to automatically activate the IME 106. In this case, the RDT client 103 and the OS 104 function as a controller. The IME 106 may be configured to be automatically activated in accordance with a text input or an attribute value related to setting or a state of the input field related to an operation of the IME. For example, in a case in which the setting is activation of the IME, the IME is automatically activated. Otherwise, the IME is not automatically activated. Alternatively, in a case in which the IME is in an active state, the IME is automatically activated. Otherwise, the IME is not automatically activated.

Conversely, in a case in which the event is not the IME activation key code (NO in S102), the RDT controller 1031 converts the key code into a key symbol via the RFB transceiver 1033 and transmits the key symbol to the host computer (server) 12 (S106). The RDT server 122 of the host computer 12 receives the key symbol and an app 124 is notified of the key symbol via the desktop manager 123.

Conversely, in a case in which the event is not the desktop event (NO in S101), it is determined whether the event is an event of the input field (S107). In a case in which the event is the event of the input field (YES in S107), predetermined event processing for the input field is performed (S108). This processing will be further described below. In a case in which the event is not the event of the input field (NO in S107), another process is performed (S109). For example, a process for a window closing button is performed.

Figure 5:
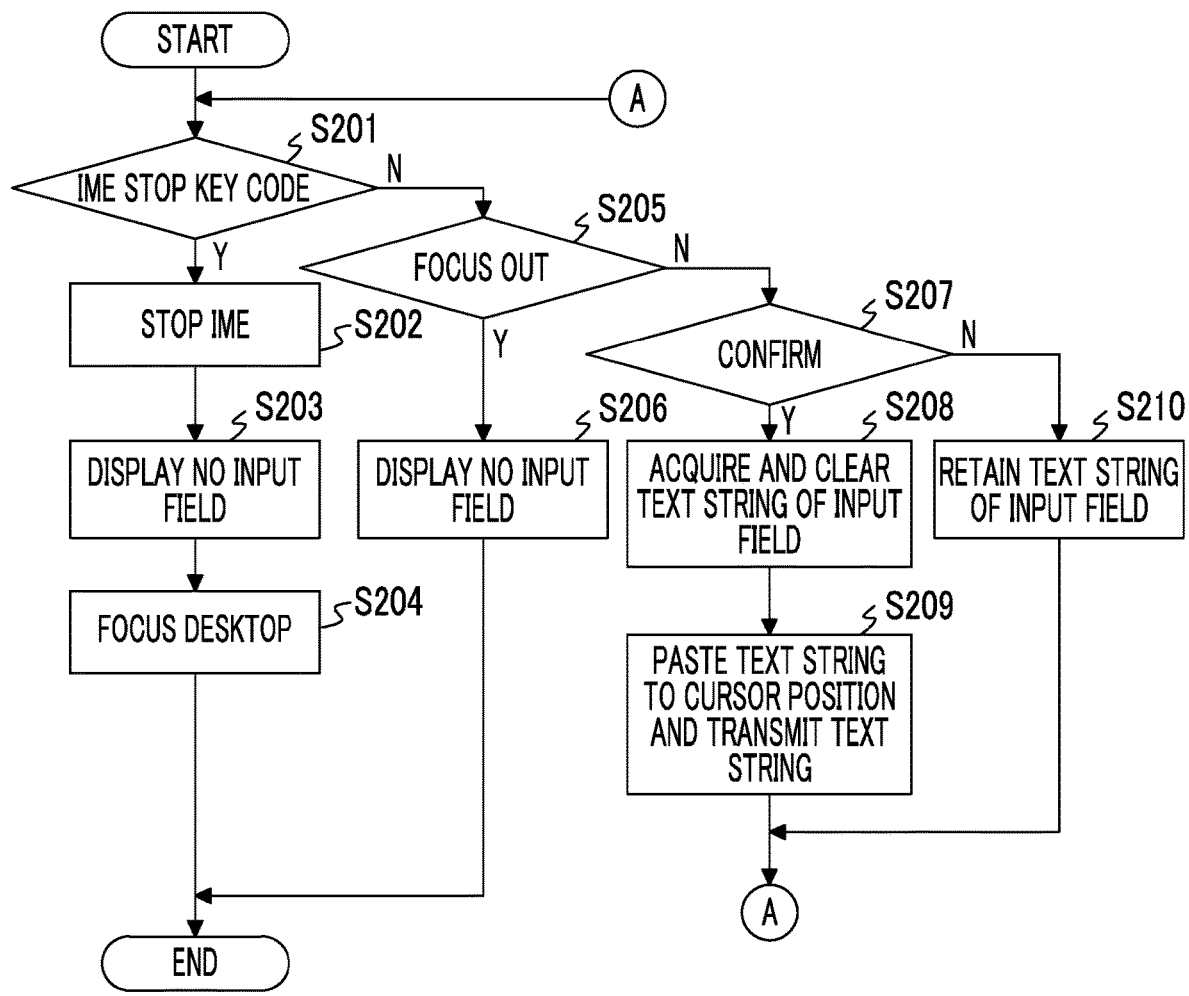
FIG. 5 is a flowchart (part 2) showing the process of the remote terminal according to the first exemplary embodiment.

FIG. 5 is a flowchart showing the details of the event processing of the input field in S108 of FIG. 4. It is assumed that the input field is displayed in S103 and the IME 106 of the remote terminal 10 is activated in S105.

First, the RDT controller 1031 determines whether the event of the input field is the IME stop key code (S201). The IME stop key code is generated, for example, by pressing a half-size/full-size key in the case of Window, as described above. In a case in which the event of the input field is the IME stop key code (YES in S201), the RDT controller 1031 stops the IME 106 which is being activated (S202). In the case in which the IME 106 is stationed, the IME 106 may be disconnected rather than being stopped. The stop of the IME 106 is meant to include the disconnection. The RDT controller 1031 may not stop the IME 106, but may be OS 104 may be entrusted to the stop. Further, in a case in which the input field is focused out in accordance with an attribute value of the input field, the IME 106 may be configured to be automatically stopped by the OS 104.

Next, the RDT controller 1031 does not display the input field in a case in which the input field controller 1032 is instructed to display the input field (S203). Then, the RDT controller 1031 focuses a display region of the desktop (S204).

Conversely, in a case in which the event of the input field is not the IME stop key code (NO in S201), the RDT controller 1031 determines whether the event is a focus-out event (S205). The "focus-out" refers to movement of an input reception state from the input field to another region. The focus-out can be generated, for example, in a case in which focus is moved to a display region of the desktop, a case in which the user points a region other than the input field with the mouse or the like, or a case in which the input filed is moved to another input field with a tab key or the like. In a case in which the event is the focus-out event (YES in S205), the RDT controller 1031 instructs the input field controller 1032 not to display the input field (S206). Along with the non-display of the input field, the IME 106 may be stopped.

In a case in which the event is not the focus-out event (NO in S205), it is determined whether the event is a confirmation key code (S207). The confirmation key code is, for example, an "Enter" key.

In a case in which the event is the confirmation key code (YES in S207), the input field controller 1032 acquires a text string of the input field and then clears the input field (S208). Subsequently, the text string is pasted to a cursor position of the desktop to be transmitted (S209). That is, the text string of the input field is pasted to the cursor position of the desktop of the host computer 12 displayed on the window 101 of the remote terminal 10 to be transmitted. The RDT server 122 notifies the RDT client 103 of the coordinates of a cursor of the host computer 12 in advance and the input field controller 1032 pastes and transmits the text string using the cursor position notified of in advance. The cursor position may be notified as coordinates of a rectangle in final frame update. The RFB transceiver 1033 realizes the paste and transmission by transmitting the text string to the cut buffer of the RDT server 122 of the host computer 12 with ClientCutText and transmitting a paste button as PointerEvent. The text string is encoded by, for example, UTF-8 to be transmitted. Thereafter, the processes subsequent to S201 are repeated.

In a case in which the event is not the confirmation key code (NO in S207), the input field controller 1032 retains the text string before the confirmation in the input field (S210). Then, the processes subsequent to S201 are repeated. Accordingly, in the process of S208, the text string retained in S210 is encoded to be transmitted to the host computer 12.

In the flowchart the process of FIG. 5, the input field is not displayed in the case in which the input field is focused out (YES in S205 and S206). However, in the case in which the input field is focused out, an operation on the confirmation key is performed, that is, the text string of the input field may be acquired and cleared (S208) and the text string may be pasted to the cursor position to be transmitted (S209).

As understood from the flowchart of the process of FIG. 5, in a case in which an event is generated in the input field, the input field controller 1032 inputs and processes a key event and retains a text string of the input field in a key code other than the IME stop key code or the confirmation key code. In a case in which the confirmation key code is input, the text string confirmed in the input field is transmitted to the RDT server 122. In a case in which the IME stop key code is input, the operation returns to the RDT controller 1031 and the RDT controller 1031 stops activating the IME 106.

Figure 6:
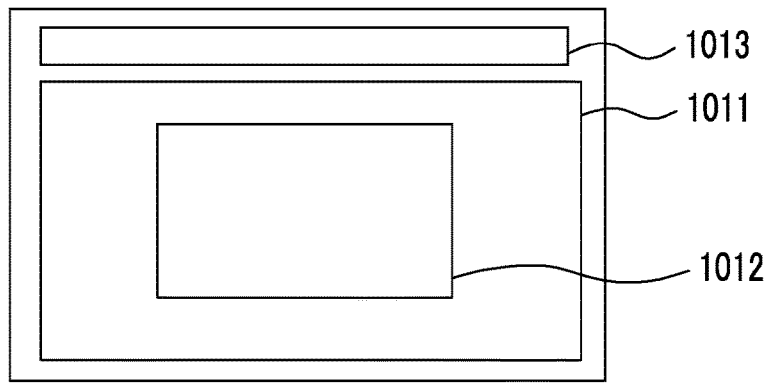
FIG. 6 is a schematic diagram showing an input field displayed on the remote terminal.

FIG. 6 schematically shows the input field displaying process performed in S103 of FIG. 4. The input field controller 1032 displays the input field on the display of the remote terminal 10 based on an instruction from the RDT controller 1031. As shown in FIG. 6, a desktop 1011 of the remote terminal 10 is displayed on the display of the remote terminal 10 and a desktop 1012 of the host computer 12 in the desktop 1011 is displayed as a rectangular bitmap. The input field controller 1032 displays, for example, an input field 1013 in a portion above the desktop 1011. The input field controller 1032 may display the input field 1013 inside the desktop 1011 or the desktop 1012 or may acquire the position of a cursor in the desktop 1012 and display the input field 1013 in alignment with the position of the cursor so that the input field 1013 overlaps the position of the cursor. In this case, text or the like can be input using the IME 106 with an operation sensation just as the text or the like is input using the IME 127 of the host computer 12. In a case in which the input field 1013 is displayed outside of the desktop 1011, a target of the event detected in S101 of FIG. 4 is not an object of the desktop 1011, but is the entire outside range including the object.

The above process is the process on the side of the remote terminal 10. Next, a process on the side of the host computer 12 will be described. In the host computer 12, the IME 127 is assumed to be in an activation state in a case in which the host computer 12 is connected to the remote terminal 10.

Figure 7:
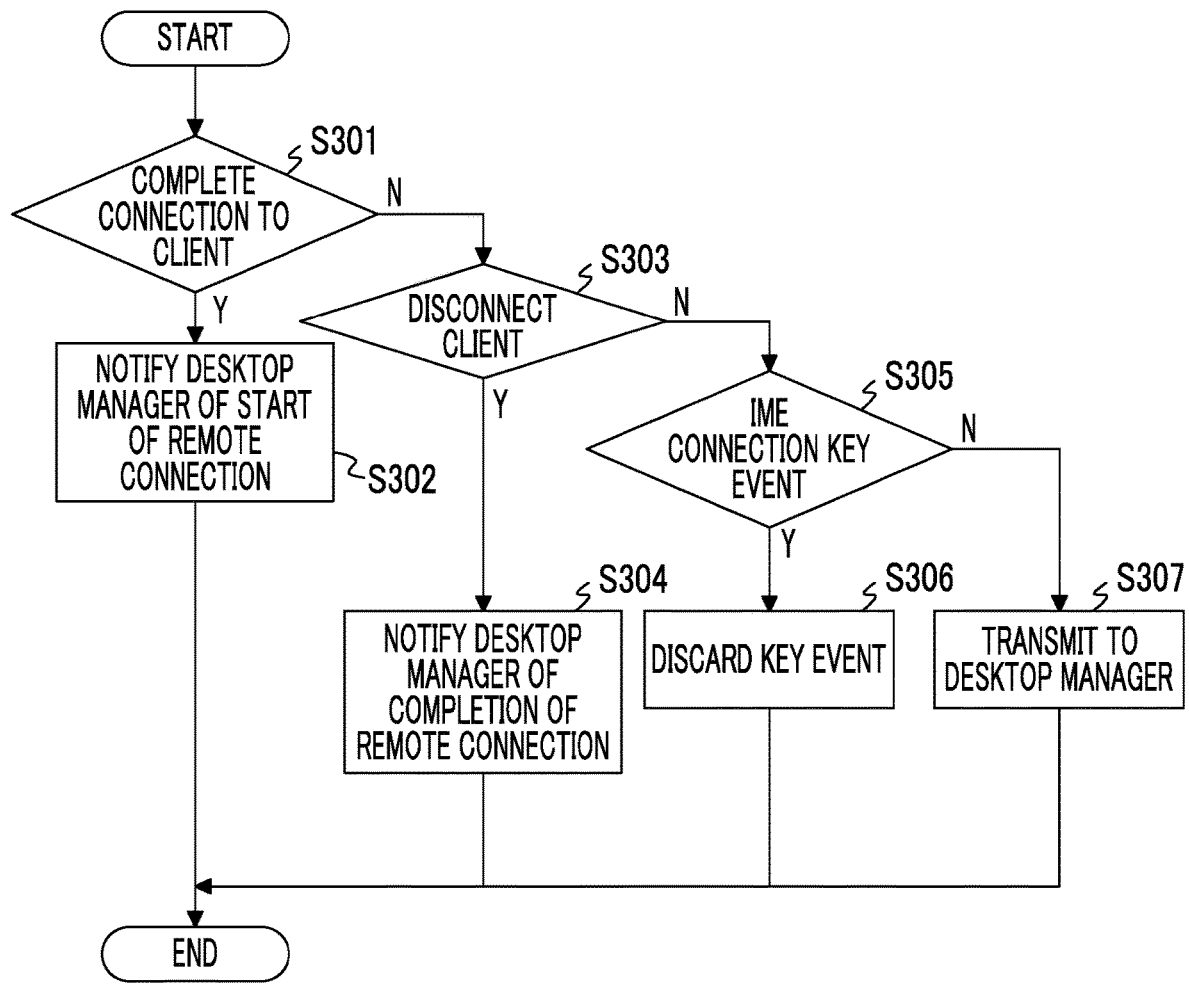
FIG. 7 is a flowchart showing a process of a host computer.

FIG. 7 is a flowchart showing a process of the RDT server 122 serving as a second controller.

First, the RDT server 122 determines whether connection to the RDT client 103 is completed (S301). In a case in which the connection is completed (YES in S301), the RDT server 122 stops the IME 127 and notifies the desktop manager 123 of start of remote connection to the desktop manager 123 (S302). The desktop manager 123 disables the IME 127 to be selected by deleting/invalidating a menu for selecting the IME 127 from a toolbar of the desktop or deleting/invalidating an item for selecting the IME 127 from a context menu according to the notification of the start of the connection.

In a case in which the connection to the RDT client 103 is not completed (NO in S301; the case includes a case in which connection to the RDT client 103 is being made), it is determined whether the RDT client 103 is disconnected (S303). In a case in which the RDT client 103 is disconnected (YES in S303), the RDT server 122 notifies the desktop manager 123 of the completion of the remote connection (S304). The desktop manager 123 enables the IME 127 to be selected by adding/validating the menu for selecting the IME 127 to the toolbar of the desktop or adding/validating the item for selecting the IME 127 from the context menu.

In a case in which the RDT client 103 is not disconnected (NO in S303), the RDT server 122 determines whether an event received from the RDT client 103 is an IME connection key event (S305). In a case in which the event is the IME connection key event (YES in S305), as described above, the input field is displayed on the side of the remote terminal 10 and the IME 106 is activated. Therefore, the key event is discarded and the IME 127 is not activated on the side of the host computer (S108). In a case in which the event is not the IME connection key event (NO in S305), the event is transmitted to the desktop manager 123 and the app 124 is notified of the event (S307). The RDT server 122 may maintain the activation state of the IME 127 in the case of the completion of the connection and stops the IME 127 at the reception timing of the IME connection key event.

In a case in which the remote terminal 10 is connected to the host computer 12 through the above-described process, the IME 127 of the host computer 12 is not used, the text string is input to the input field using the IME 106 and the conversion database DB 107 of the remote terminal 10, and the confirmed text string is transmitted from the remote terminal 10 to the host computer 12.

Second Exemplary Embodiment

Next, a case in which the process according to the second exemplary embodiment is mounted on, for example, JavaScript (registered trademark) will be described.

First, a basic process of the RDT client 103 set in JavaScript will be described.

In a case in which a browser installed in an HDD or the like of the remote terminal 10 is activated, the desktop manger 102 displays a browser window on the display. The browser reads a document file such as HTML designated with a text string input in a URL field. The document file may be a file in the remote terminal 10 or may be read from a web server. The web server may be any computer connected via the network 14.

The browser performs drawing in a browser window based on display information in a document. The browser executes a program in a case in which a program is described in the document. In a case in which there is a program referred to with an URL in the document, the browser reads and executes the program. The program is described by JavaScript or the like. The program may be a program operating as an applet on a Java OS.

A procedure in which the RDT client 103 that functions as a controller or a first controller of the remote terminal 10 is connected to the RDT server 122 that functions as a second controller of the host computer 12, a procedure in which drawing information is transmitted and received, and a procedure in which a keyboard or mouse event is transmitted and received are the same those of the first exemplary embodiment. The RDT client 103 performs drawing in a drawing object of HTML based on the received drawing information. A canvas component of HTML is used as the drawing objet.

The RDT client 103 monitors a key event or a mouse event in regard to the canvas component and detects the event. The detected event is transmitted as corresponding event information to the RDT server 122.

Figure 8:
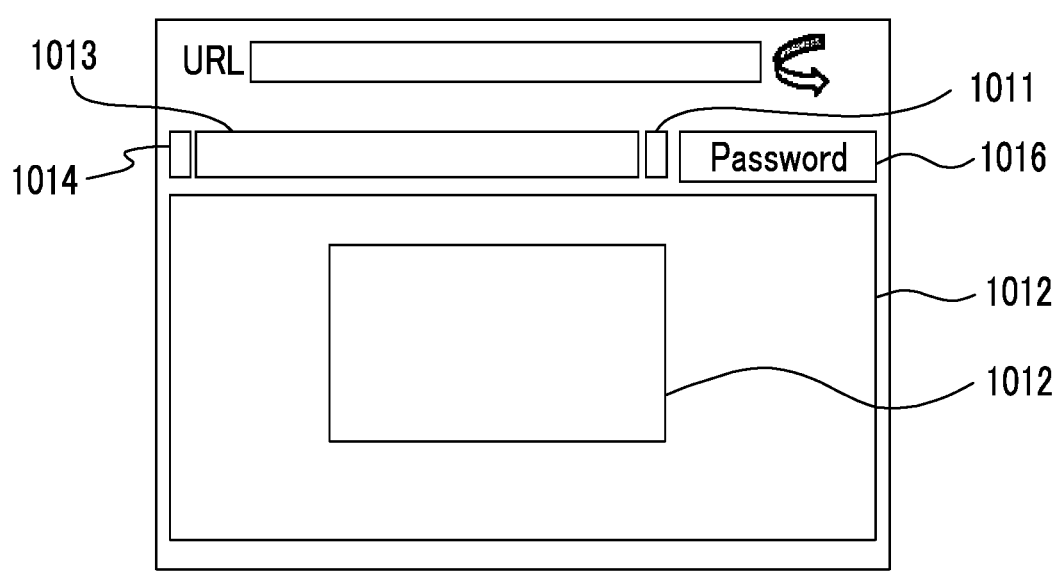
FIG. 8 is a schematic diagram showing an input field container of the remote terminal.

FIG. 8 shows an example of a container of an input field. An input field 1013, a backtab input 1014, a tab input 1015, and a password button 1016 are ready. The container is not displayed in a default state. That is, in the default state, the input field 1013, the backtab input 1014, the tab input 1015, and the password button 1016 are not displayed in the window 101 of the remote terminal 10 and the container is displayed using the IME activation key code as a trigger.

Figure 9:
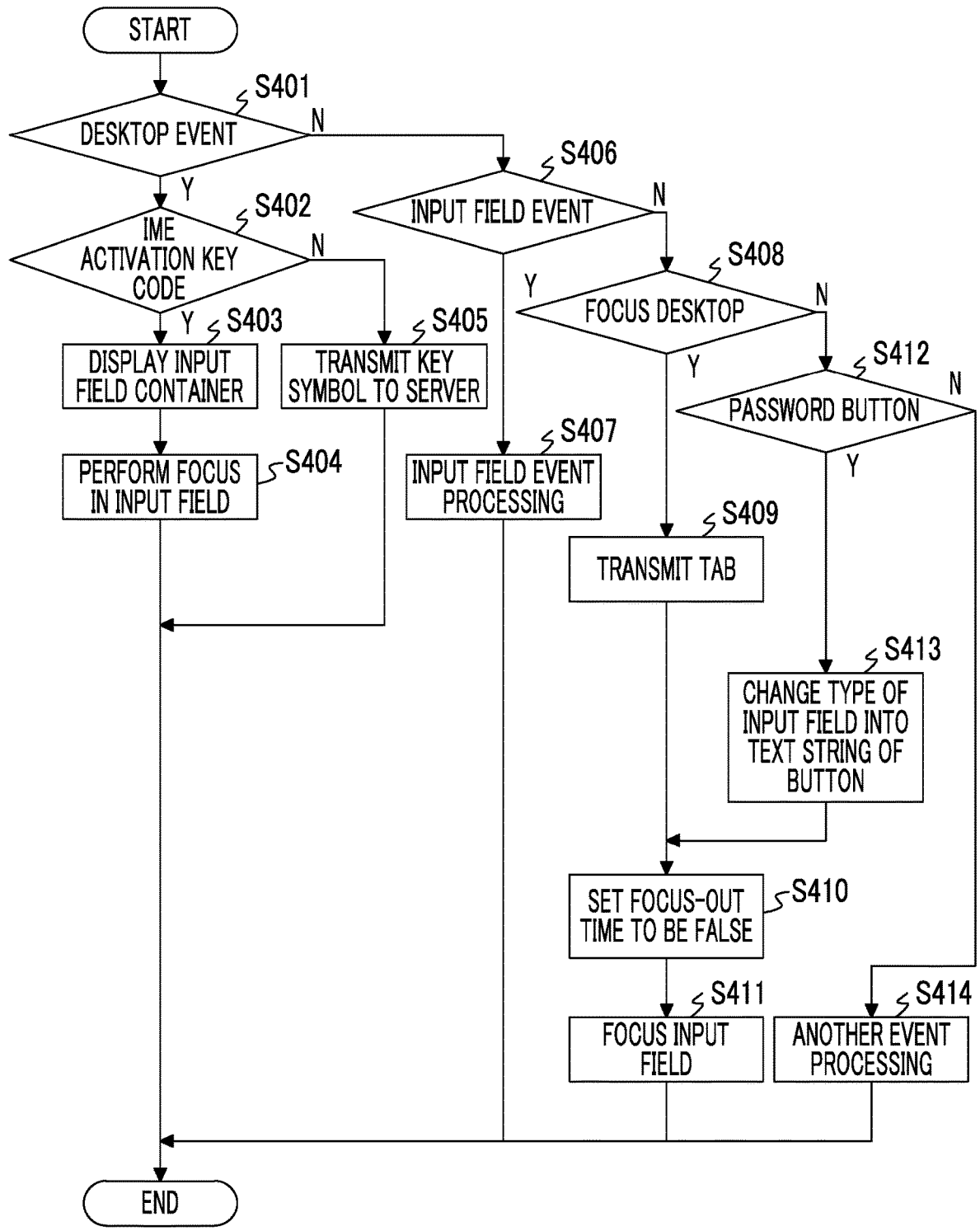
FIG. 9 is a flowchart (part 1) showing a process of a remote terminal according to a second exemplary embodiment.

FIG. 9 is a flowchart showing a process of the RDT client 103.

First, the RDT controller 1031 of the RDT client 103 determines whether an event is an event of a desktop display object (S401). In a case in which the event is the event of the desktop display object (YES in S401), it is subsequently determined whether the event is the IME activation key code (S402). In a case in which the event is the IME activation key code (YES in S402), the RDT controller 1031 activates the IME 106. The OS 104 may activate the IME 106 and is connected to the IME 106 in a case in which the IME 106 is stationed. The input field controller 1032 displays the input field container based on an instruction from the RDT controller 1031 (S403) and performs focus in the input field (S404). Thus, an input in the input field using the IME 106 can be performed. The IME 106 may be activated in association with the focus in the input field as in the first exemplary embodiment. In short, based on an input of the IME activation key code, the IME 106 may be activated in association with the input and the input field may be displayed.

In a case in which the event is not the IME activation key code (NO in S402), the RDT controller 1031 converts the key code into a key symbol via the RFB transceiver 1033 and transmits the key symbol to the host computer 12 (S405).

Conversely, in a case in which the event is not the event of the desktop display object (NO in S401), it is determined whether the event is the event of the input field (S406). In a case in which the event is the event of the input field (YES in S406), the input field controller 1032 performs predetermined input field event processing based on an instruction from the RDT controller 1031 (S407). The input field event processing will be further described below.

In a case in which the event is not the event of the input field (NO in S406), it is determined whether the desktop is focused (S408). In a case in which the desktop is focused (YES in S408), the RDT controller 1031 transmits the key symbol of the tab to the host computer 12 via the RFB transceiver 1033 (S409). Thus, the focus is moved to a subsequent field of the desktop on the side of the host computer 12. By controlling the backtab in this way, the focus is moved to the field before the desktop on the side of the host computer 12. Then, the RDT controller 1031 sets a focus-out time of the input field to be false (S410). In a configuration in which the input field is not displayed in a case in which the input field is focused out, the input field is prevented from being not displayed due to the focus-out of the input field by the tab (or the password button). Then, the focus returns to the input field (S411).

In a case in which the desktop is not focused (NO in S408), it is determined whether the password button 1016 is clicked (S412). In a case in which the password button 1016 is clicked (YES in S412), the input field controller 1032 changes the type of input field to a text string of the button (S413). In a case in which the type of input field is text, the type is changed to a password and the text string of the button is changed to text. In a case in which the type of input field is a password, the type of input field is changed to text and the text string of the button is changed to a password. Further, as in the case of the transmission of the tab, S410 and S411 are performed. In a case in which the password button is clicked (NO in S412), another event is processed (S414). For example, in a case of a pointer event, the RDT controller 1031 transmits the pointer event to the RDT server 122 via the RFB transceiver 1033.

In the flowchart of the process of FIG. 9, in a case in which the event is the IME activation key code, the input field is displayed (YES in S402 and S403). However, the IME 106 may be activated by displaying the input field and then pressing a key related to the IME activation.

Figure 10:
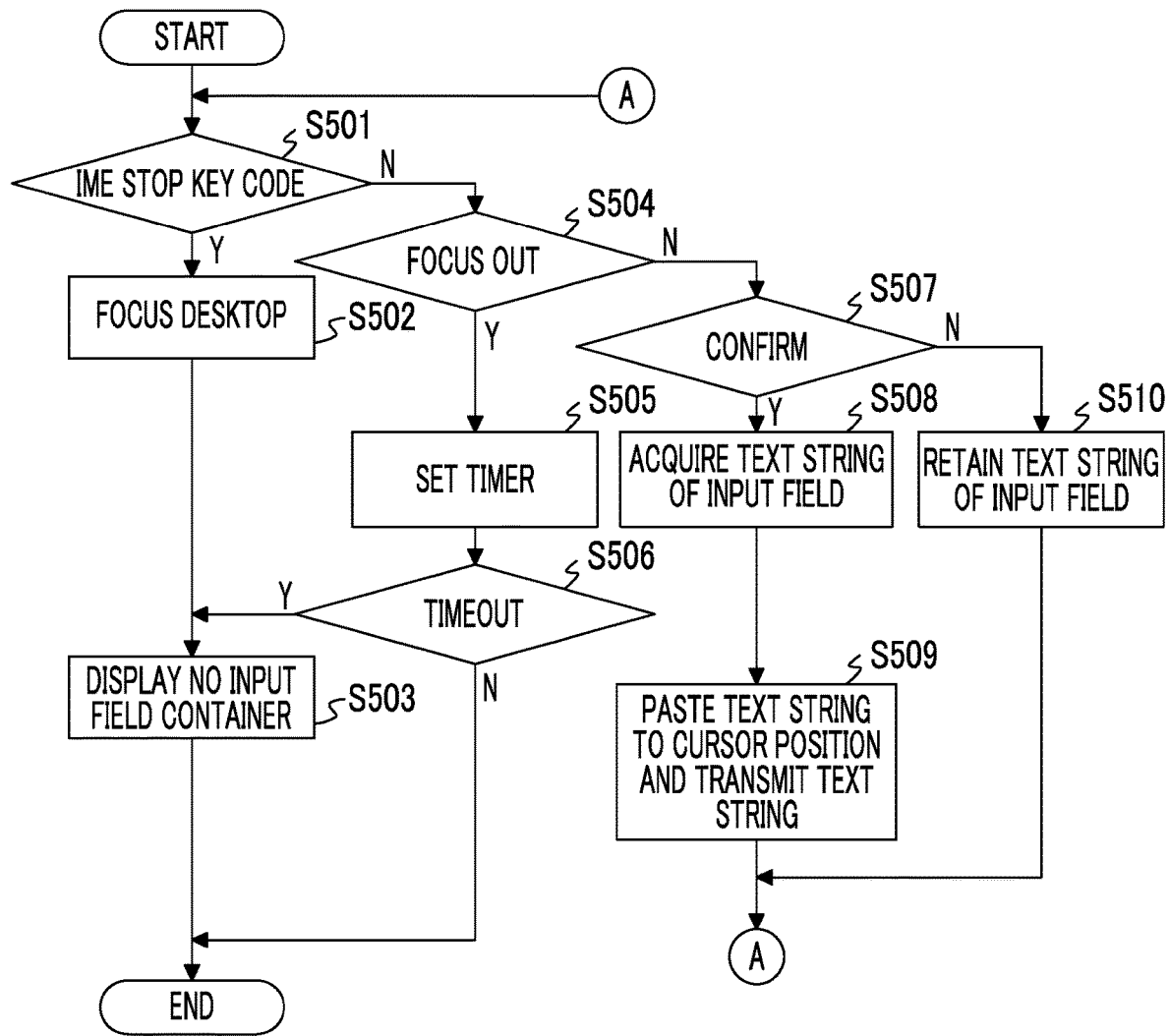
FIG. 10 is a flowchart (part 2) showing the process of a remote terminal according to the second exemplary embodiment.

FIG. 10 is a flowchart showing the details of the input field event processing in S407 of FIG. 9.

First, the RDT controller 1031 determines whether an event of the input field is the IME stop key code (S501). In a case in which the event is the IME stop key code (YES in S501), the desktop is focused (S502) and the input field container is set from the display state to the non-display state (S503).

In a case in which the event of the input field is not the IME stop key code (NO in S501), the RDT controller 1031 determines whether focus-out is performed (S504). In the case of the focus-out (YES in S504), the RDT controller 1031 sets a timer (S505) and determines whether timeout occurs (S506). In a case in which a predetermined time elapses and the timeout occurs, the input field container is not displayed (S503). In a case in which the focus returns to the input field with the tab or the backtab, it is determined that the timeout does not occur and the display state of the input field is maintained.

In a case in which the focus-out is not performed (NO in S504), the RDT controller 1031 determines whether the event is a confirmation key (S507). In a case in which the event is the confirmation key (for example, "Enter") (YES in S507), the input field controller 1032 acquires the text string from the input field and clears the text string based on an instruction from the RDT controller 1031 (S508) and pastes the text string to a cursor position and transmits the text string (S509). The cursor position may be notified as coordinates of a rectangle in final frame update. The RFB transceiver 1033 realizes the paste and transmission by transmitting the text string to the cut buffer of the RDT server 122 of the host computer 12 with ClientCutText and transmitting a paste button as PointerEvent. Then, the processes subsequent to S501 are repeated. In a case in which the event is not the confirmation key (NO in S507), the text string of the input field is maintained (S510). Then, the processes subsequent to S501 are repeated. Accordingly, in the processes of S508 and S509, the text string maintained in S510 is encoded to be transmitted to the host computer 12.

As described above, in the embodiment, in a case in which the host computer 12 is remotely operated with the remote terminal 10, not the IME 127 of the host computer 12 but the IME 106 of the remote terminal 10 is used.

The exemplary embodiments of the invention have been described above, but the invention is not limited thereto and various modification examples can be made. Hereinafter, modification examples will be described.

Modification Example 1

In the exemplary embodiments, as shown in FIG. 4, in a case in which the desktop event is the IME activation key code, the IME 106 of the remote terminal 10 is activated and the IME 127 of the host computer 12 is stopped and invalidated. However, whether the IME 106 of the remote terminal 10 is activated can be appropriately selected.

Figure 11:
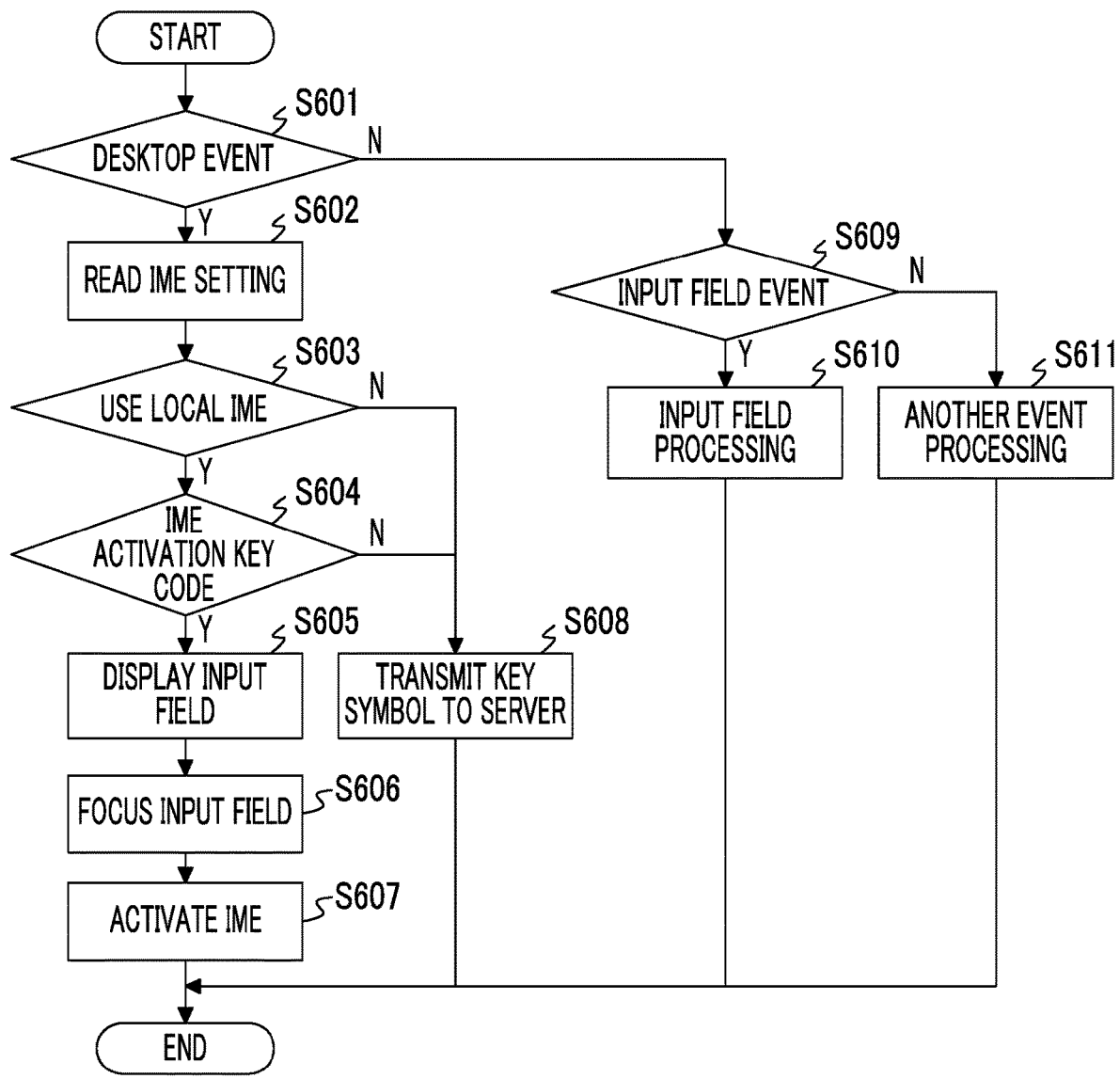
FIG. 11 is a flowchart showing a process of a remote terminal according to a modification example.

FIG. 11 is a flowchart showing key event processing of the RDT controller 1031 in a modification example.

First, the RDT controller 1031 determines whether an event is a desktop event, that is, an event in regard to an object in a display region of a desktop screen of the host computer 12 displayed in the window 101 of the remote terminal 10 (S601). An input region of the desktop screen of the host computer 12 is a part of a rectangular bitmap image, as described above. For example, an operation in the input region with a mouse is determined to be the desktop event.

In a case in which the event is the desktop event (YES in S601), the RDT controller 1031 subsequently reads IME setting (S602). The IME setting is data that defines whether the local IME is used, that is, the IME 106 of the remote terminal 10 is used or the IME 127 of the host computer 12 is used. In a case in which the use of the local IME 106, that is, the IME 106 of the remote terminal 10, is set, it is subsequently whether the event is the IME activation key code (S603). The subsequent processes (S605 to S607) are the same as the processes of FIG. 4. In a case in which the use of the local IME is not set, that is, the use of the IME 106 of the remote terminal 10 is not set, the key symbol is transmitted to the server (S608). In this case, as in the related art, text is input using the IME 127 of the host computer 12.

The processes (S609 to S611) in a case of NO in S601 are the same as the processes in the case of FIG. 4.

The IME setting is performed in advance by the user and is stored in the remote terminal 10. The IME setting in S602 may be read only once in the case of the remote desktop activation, the setting value may be stored, and the stored setting value may be subsequently determined.

Modification Example 2

In the exemplary embodiments, in a case in which the desktop event is the IME activation key code, the IME 106 of the remote terminal 10 is activated and the IME 127 of the host computer 12 is stopped and invalidated. However, in a case in which the desktop event is a specific key code, the IME 106 of the remote terminal 10 may be invalidated and a process of activating the IME 127 of the host computer 12 may be performed even during the connection of the remote terminal 10 and the host computer 12. Specifically, the RDT controller 1031 determines whether the desktop event is the specific key code. In a case in which the desktop event is the specific key code, the desktop is focused as the non-display of the input field and the fact that the IME 106 is invalidated is transmitted to the RDT server 122. The RDT server 122 notifies the desktop manager 123 that the IME 106 is invalidated. The desktop manager 123 activates the IME 127 by adding/validating a menu for selecting the IME 127 to the toolbar of the desktop. The specific key code can be said to be return key code that means the activation of the IME 127 of the default host computer 12.

In the default state, the IME 127 of the host computer 12 is activated. Not only is the IME 127 activated in advance on the side of the host computer 12 but the IME 127 may also be activated at the same time as the connection of the remote terminal 10 and the host computer 12. Further, in a case in which the IME 127 is not activated in the case of the connection, the remote terminal 10 and the host computer 12 maybe connected after the activation of the IME 127.

Modification Example 3

In the exemplary embodiments, as shown in FIG. 3, the RDT controller 1031 and the input field controller 1032 are logically separated as separate modules, but it is needless to say that at least some of the functions of the input field controller 1032 may be performed by the RDT controller 1031. For example, the RDT controller 1031 may perform a function of retaining a text string input to the input field and transmitting the text string to the RDT server 122 according to an input of the confirmation key code.

Modification Example 4

In the exemplary embodiments, the remote terminal 10 may be a tablet terminal, a smartphone, or an image forming apparatus such as a multi-function apparatus that has plural functions such as copying and scanning as well as a PC. The host computer 12 may be an image forming apparatus such as a multi-function apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A remote operation apparatus comprising:
a memory, configured to store a conversion database;
a display, configured to display a desktop screen of an apparatus to be remotely operated; and
a processor that remotely operates the apparatus to be remotely operated, configured to:
   receive a key event and determine whether the key event is a desktop event;
   in response to the key event being the desktop event, determine whether a key code of the key event corresponds to an activation instruction to activate a text input assistance program of the remote operation apparatus;
   in response to the key code corresponding to the activation instruction, display an input field and the desktop screen of the apparatus to be remotely operated on a desktop screen of the remote operation apparatus, activate the text input assistance program of the remote operation apparatus, and enable the text input assistance program of the remote operation apparatus to input text to the input field;
   in response to the key code not corresponding to the activation instruction, convert the key code into a key symbol according to the conversion database and transmit the key symbol to the apparatus to be remotely operated, wherein the key symbol corresponds to an input method of the apparatus to be remotely operated; and
   in response to the key event not being the desktop event and being an event of the input field, transmit the text inputted to the input field to the apparatus to be remotely operated.

2. The remote operation apparatus according to claim 1, wherein the processor maintains a text string in a case in which the text string is input to the input field, and the processor acquires a text string input to the input field and transmits the text string to the apparatus to be remotely operated in a case in which a confirmation instruction is input to the input field.

3. The remote operation apparatus according to claim 2, wherein in the case in which the processor transmits the text string, the processor pastes the text string to a cursor position of the desktop screen of the apparatus to be remotely operated to transmit the text string.

4. The remote operation apparatus according to claim 1, wherein in a case in which a stop instruction to stop the text input assistance program of the remote operation apparatus is input, the processor does not display the input field displayed on the desktop screen of the remote operation apparatus and stops the text input assistance program of the remote operation apparatus.

5. The remote operation apparatus according to claim 2, wherein in a case in which a stop instruction to stop the text input assistance program of the remote operation apparatus is input, the processor does not display the input field displayed on the desktop screen of the remote operation apparatus and stops the text input assistance program of the remote operation apparatus.

6. The remote operation apparatus according to claim 3, wherein in a case in which a stop instruction to stop the text input assistance program of the remote operation apparatus is input, the processor does not display the input field displayed on the desktop screen of the remote operation apparatus and stops the text input assistance program of the remote operation apparatus.

7. The remote operation apparatus according to claim 1, wherein in a case in which the input field displayed on the desktop screen of the remote operation apparatus is focused out, the processor does not display the input field displayed on the desktop screen of the remote operation apparatus and stops the text input assistance program of the remote operation apparatus.

8. The remote operation apparatus according to claim 2, wherein in a case in which the input field displayed on the desktop screen of the remote operation apparatus is focused out, the processor does not display the input field displayed on the desktop screen of the remote operation apparatus and stops the text input assistance program of the remote operation apparatus.

9. The remote operation apparatus according to claim 3, wherein in a case in which the input field displayed on the desktop screen of the remote operation apparatus is focused out, the processor does not display the input field displayed on the desktop screen of the remote operation apparatus and stops the text input assistance program of the remote operation apparatus.

10. The remote operation apparatus according to claim 1, wherein the display displays the desktop screen of the apparatus to be remotely operated in a state in which a text input assistance program of the apparatus to be remotely operated is activated.

11. A remote operation system comprising:
a remote terminal; and
a host computer which is able to be connected to the remote terminal,
wherein the remote terminal includes
   a memory that stores a conversion database,
   a display that displays a desktop screen of the host computer in a case in which the remote terminal is connected to the host computer, and
   a first processor that remotely operates the host computer and configured to:
      receive a key event and determine whether the key event is a desktop event;
      in response to the key event being the desktop event, determine whether a key code of the key event corresponds to an activation instruction to activate a text input assistance program of the remote terminal;
      in response to the key code corresponding to the activation instruction, display an input field and the desktop screen of the host computer on a desktop screen of the remote terminal, activate the text input assistance program of the remote terminal, and enable the text input assistance program of the remote terminal to input text to the input field;
      in response to the key code not corresponding to the activation instruction, convert the key code into a key symbol according to the conversion database and transmit the key symbol to the host computer, wherein the key symbol corresponds to an input method of the host computer; and
      in response to the key event not being the desktop event and being an event of the input field, transmit the text inputted to the input field to the host computer, and
wherein the host computer includes a second processor that stops a text input assistance program of the host computer in a case in which the host computer is connected to the remote terminal.

12. A non-transitory computer readable medium storing a program causing a computer to perform:
- receiving a key event and determine whether the key event is a desktop event;
- in response to the key event being the desktop event, determining whether a key code of the key event corresponds to an activation instruction to activate a text input assistance program of a remote operation apparatus;
- in response to the key code corresponding to the activation instruction, displaying an input field and the desktop screen of the apparatus to be remotely operated on a desktop screen of the remote operation apparatus, activating the text input assistance program of the remote operation apparatus, and enabling the text input assistance program of the remote operation apparatus to input text to the input field;
- in response to the key code not corresponding to the activation instruction, converting the key code into a key symbol according to a conversion database stored in the remote operation apparatus and transmitting the key symbol to the apparatus to be remotely operated, wherein the key symbol corresponds to an input method of the apparatus to be remotely operated; and
- in response to the key event not being the desktop event and being an event of the input field, transmitting the text inputted to the input field to the apparatus to be remotely operated.

\* \* \* \* \*